United States Patent
Letas

(10) Patent No.: US 8,189,353 B2
(45) Date of Patent: May 29, 2012

(54) METHOD FOR THE OPERATION AND USE OF A CONVERTER

(75) Inventor: Heinz-Hermann Letas, Susel/Gross Meinsdorf (DE)

(73) Assignee: Repower Systems AG, Hamburg (DE)

( * ) Notice: Subject to any disclaimer, the term of this patent is extended or adjusted under 35 U.S.C. 154(b) by 448 days.

(21) Appl. No.: 12/444,334

(22) PCT Filed: Oct. 1, 2007

(86) PCT No.: PCT/EP2007/008510
§ 371 (c)(1),
(2), (4) Date: Apr. 3, 2009

(87) PCT Pub. No.: WO2008/040513
PCT Pub. Date: Apr. 10, 2008

(65) Prior Publication Data
US 2009/0322079 A1   Dec. 31, 2009

(30) Foreign Application Priority Data
Oct. 5, 2006   (DE) .......................... 10 2006 047 503

(51) Int. Cl.
*H02M 1/12* (2006.01)

(52) U.S. Cl. ....................................................... 363/39

(58) Field of Classification Search .................... 290/44, 290/55; 363/39, 40, 44
See application file for complete search history.

(56) References Cited

U.S. PATENT DOCUMENTS 7,309,930 B2 * 12/2007 Suryanarayanan et al. .... 290/55
7,518,886 B1 *  4/2009 Lai et al. .......................... 363/17
2005/0195624 A1  9/2005 Tarkiainen et al.

FOREIGN PATENT DOCUMENTS

| DE | 19737590 C1 | 10/1998 |
| DE | 69527750 T2 | 4/2004 |
| EP | 0727859 A2 | 8/1996 |
| EP | 0868006 A1 | 9/1998 |

OTHER PUBLICATIONS

Panda, Debiprasad et al.; "A Novel Control Strategy for the Rotor Side Control of a Doubly-Fed Induction Machine"; Industry Applications Conference, 2001; Thirty-Sixth IAS Annual Meeting; Conference Record of the 2001 IEEE; vol. 3; Sep. 30-Oct. 4, 2001; pp. 1695-1702.

* cited by examiner

*Primary Examiner* — Gary L Laxton
(74) *Attorney, Agent, or Firm* — Rankin, Hill & Clark LLP

(57) ABSTRACT

A method for the operation of a converter of a power-generating generator system that can be connected to an electrical AC network, and the use of the converter is provided.

The converter is operated by a regulation device regulating the converter as an active audio frequency block. At least one audio frequency current of at least one specified audio frequency is detected. An AC current progression that is to be transmitted to the converter in the regulation device is determined, where at least one audio frequency current is at least partially impressed on the AC current progression. The AC current progression in the converter is generated. The AC current progression generated by the converter is then supplied to the AC network.

30 Claims, 3 Drawing Sheets

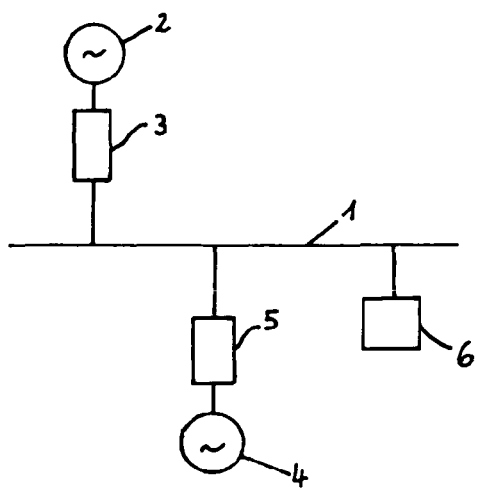
Fig. 1 - Prior Art
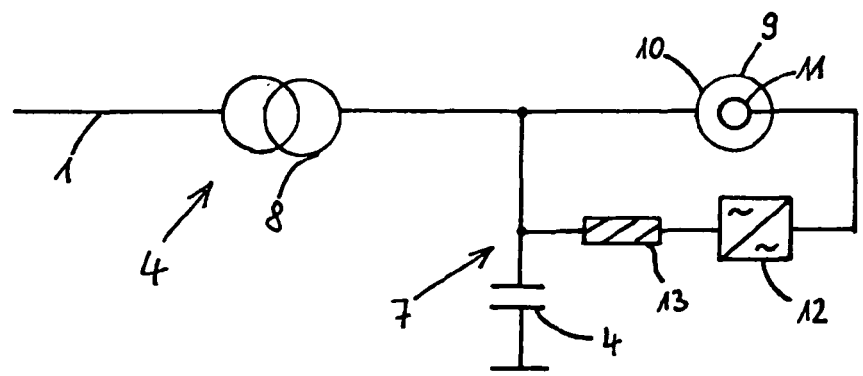
Fig. 2 - Prior Art
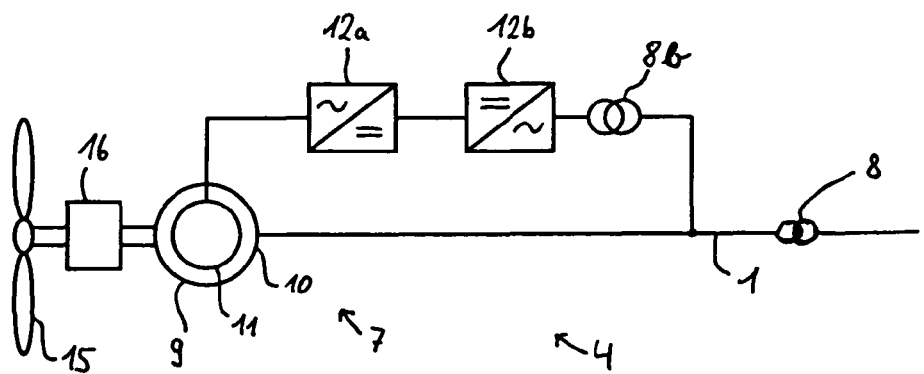
Fig. 3 - Prior Art

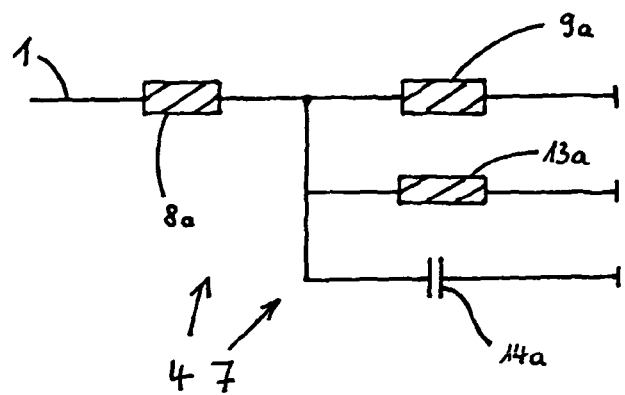
Fig. 4 - Prior Art
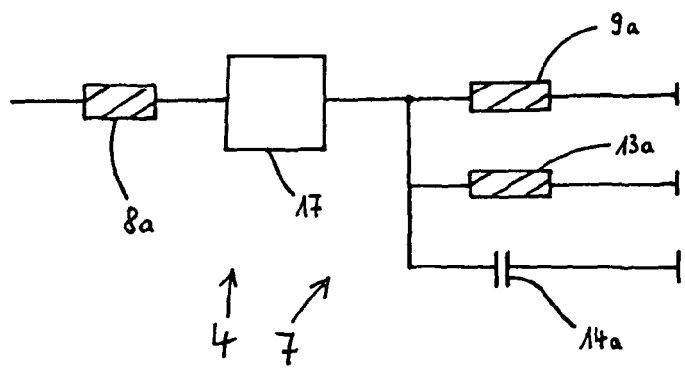
Fig. 5 - Prior Art
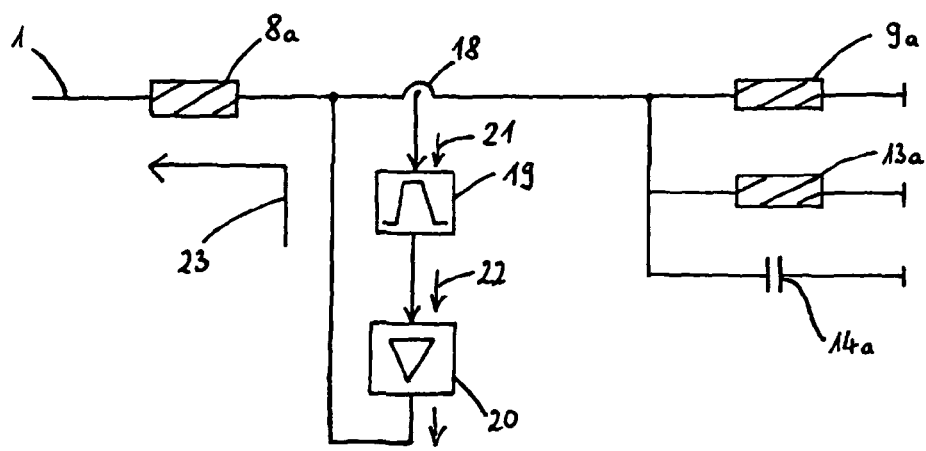
Fig. 6 - Prior Art

METHOD FOR THE OPERATION AND USE OF A CONVERTER

BACKGROUND OF THE INVENTION

1. Field of the Invention

The invention relates to a method for the operation of a converter, in particular of a wind power plant, of a power-generating generator system, in particular of a wind power plant, that can be connected to an electrical AC network and the use of a converter. The invention also relates to a computer program product with program code means, a data carrier, a power-generating generator system and a wind power plant.

2. Description of Related Art

Electrical AC networks are normally operated with a base frequency of approx. 50 Hz or 60 Hz in North America. Electrical power generators, for example power plants, generators or wind power plants, supply the generated power to the AC network at this base frequency. Small or large electrical consumers, such as electrical household devices or industrial companies, take the required power from the AC network in the form of AC power.

AC networks are also used to transfer and control signals. For example, signals are supplied to the network and are transmitted to signal receivers by means of so-called audio frequency ripple control systems. "Audio frequency" (also "AF") refers to the frequency range from approx. 100 Hz to approx. 500 Hz, which is also relayed in an only insignificantly weakened state in the AC network over greater distances. Typically, each ripple control system transmits at a ripple control frequency determined by the network operator in the audio frequency range.

The ripple control signals are superimposed on the power supply voltage at the connection point of a ripple control system as additional control or AC voltage. The amplitude of the control voltage is thereby in the range of less than 1 percent to a few percent of the amplitude of the base frequency in the AC network. In this connection, the terms "impressed," "added up," and "superimposed" are used synonymously.

En route to the receiver of the ripple control signal, the signal is weakened by the consumer and power generator connected to the network in that the connected consumers or generators take part of the signal current and, thus, reduce the remaining signal current in the AC network. The weakening is undesired, since the signal levels themselves are already small. In order to keep the weakening as small as possible, the least possible, or no signal current, should be taken from the consumers or generators connected to the AC network.

The amount of signal current taken by a generator or a consumer depends on the signal voltage and the impedance of the respective consumer or generator at the ripple control frequency. The impedance is the frequency-dependent (complex) resistance of the consumer or generator. The higher the real portion of the impedance of the consumer or generator at the ripple control frequency, the less signal power is absorbed by the consumer or generator. In order to counteract a weakening of ripple control signals in the AC network, a high impedance of the generator or consumer is thus required at the ripple control frequency.

The following covers the situation with power generators, in particular wind power plants. The same considerations also apply to other power generators.

Wind power plants, the electrical components of which include generator, frequency converter and transformer, generally already have sufficient impedance at the ripple control frequency so that additional means do not need to be used to obtain ripple control signals in the AC network. However, this is not sufficient at some locations, in particular when small signal levels are used.

A slight impedance increase is possible with passive means. For an impedance increase of 10 to 20 percent, it is sufficient to replace an already existing transformer with a transformer with a higher short-circuit voltage value or to switch the voltage taps, if possible. For a stronger increase in the impedance at the audio frequency, a passive audio frequency block or a passive filter can also be used in the form of capacitor banks.

Both the transformer, with a higher short-circuit voltage value, and the passive audio frequency block have a higher required space due to the larger dimensioned transformer or due to the necessity of large-dimensioned capacitor banks. These measures also cause increased losses and additional costs. The achievable impedance increase is limited.

A strong improvement is achieved with an active audio frequency block. It works such that audio frequency currents, i.e. AC currents at the ripple control frequency or audio frequency, are first let into the system unfiltered, together with the base frequency from the AC network. The entire current flowing into the system is measured in a total current measurement. The share of the audio frequency current or the signal current is determined by means of a frequency filter set to the audio frequency or the ripple control frequency.

The measured audio frequency current is fed to an amplifier, which generates an audio frequency compensation current suitable for the audio frequency current, which is fed back into the network in front of the measuring point. The sum of the audio frequency current flowing into the system and the audio frequency compensation current fed back into the network cancel each other out so that the overall arrangement for the audio frequency appears to have a very high impedance. The arrangement is thus very effective, but is expensive due to the large amplifier and space required. Even with this technique, losses in the supplied power are unavoidable.

In addition to the ripple control signals, other generators or consumers also generate audio frequency currents in the AC network, above all harmonic oscillations of the base frequency of the AC network, but also other audio frequency shares.

BRIEF SUMMARY OF THE INVENTION

The object of the invention is to realize in the case of a power generator, in particular of a wind power plant, an active audio frequency block without or with only little constructive effort or additional space requirement in a manner that saves costs.

This object is solved through a method for the operation of a converter, in particular of a wind power plant, of a power-generating generator system, in particular of a wind power plant, that can be connected to an electrical AC network, wherein the converter is operated by means of a regulation device regulating the converter as an active audio frequency block, with the following process steps:

Detection of at least one audio frequency current of at least one specified audio frequency, Determination of an AC current progression to be transmitted to the converter in the regulation device, wherein at least one detected audio frequency current is at least partially impressed on the AC current progression, Generation of the AC current progression in the converter and Supply of the AC current progression generated by the converter to the AC network.

By means of the method according to the invention, the function of the active audio frequency block is integrated into an already existing converter or frequency converter of the power-generating generator system. The external amplifier needed for a conventional active audio frequency block is saved. With the converter or frequency converter functioning as an active audio frequency block, both network-side and generator-side audio frequency currents, i.e. those generated by the generator or by the generator system, can generally be blocked.

Within the scope of the invention, a converter is understood as both a frequency converter and as an AC converter. An AC converter is thereby also understood to be a rectifier.

In the present connection, "at least one audio frequency current" means one or more audio frequency currents at one or more frequencies, for example one or more known ripple control frequencies and/or harmonic oscillations of the base frequency of the AC network.

In order to continue supplying ripple control signals in the network undamped and to switch off harmonics of the base frequency in the network if applicable, network-side audio frequency currents are preferably detected. This means that the total current of the AC current in the AC network is measured on the network side of the system and audio frequency currents are extracted from it.

This advantageously occurs by means of at least one band-pass filter, by means of which network-side audio frequency currents are filtered out of the network-side AC current and are relayed to the regulation device. This is advantageous, since an immediate and fast reaction for example to steep-sloped and short ripple control signals, which are relayed to the regulation device through the band-pass filter without delay, is possible.

Alternatively or additionally, the network-side audio frequency currents are preferably detected in or by means of the regulation device. The measured progression of the network-side AC current is thereby relayed in the entire frequency range to the regulation device and undergoes an analysis there, for example a Fourier analysis or a vector analysis. Other components, such as band-pass filters, are not required. In comparison with the use of a band-pass filter, this approach entails a slight time delay in the detection of the ripple control signals, depending on the analysis method and the speed of the regulation device. This is not a problem as long as the time delay is short compared to the signal length.

In order to filter out audio frequency currents generated by the generator, it is provided according to the invention that generator-side audio frequency currents are detected.

It is advantageous in one embodiment if the audio frequency currents are captured at a network supply point and/or are regulated for it or for a network supply point. It is also conceivable to use the converter such that a ripple control signal is supplied by means of the converter.

It is also preferably provided that the generator-side audio frequency currents are filtered out of the generator-side AC current by means of at least one band-pass filter and are relayed to the regulation device and/or are detected in the regulation device.

Constructive effort is reduced and the selectivity and thus the impedance, for example, for the ripple control frequency is increased, if preferably the active audio frequency block can be or is set for a predetermined, limited, i.e. tight frequency range for mono-frequent or narrow-band, network-side signals. A tight or narrow-band frequency range is thereby understood as a frequency range that is smaller than the base oscillation of the AC network so that it does not overlap with harmonic oscillations of the base frequency.

Advantageously, the tight or predetermined, limited frequency range can be or is set to a ripple control frequency, wherein harmonic frequencies of the base frequency adjacent in the frequency spectrum are weakened with respect to the ripple control frequency. If the signals from the band-pass filter are integrated with respect to their strength, then the strength of the ripple control signal is determined very exactly. It is, thus, avoided that the ripple control signal is overcompensated by means of the frequency converter. The same goes for a Fourier analysis and for other frequency analyses in the regulation device, such as vector analyses based on coordinate systems, which involve permanently selectable frequencies, e.g. ripple control frequency, or adjustable frequencies.

Alternatively or in addition to a specialization on ripple control frequencies, it is preferably provided that the predetermined, limited frequency range can be or is set to at least one harmonic frequency of the base frequency. In this manner, a specifically selected harmonic frequency of the base frequency is taken into consideration in the case of the audio frequency block. It is also provided to process several frequencies or frequency ranges in parallel, either by means of several band-pass filters, which are set according to the frequencies, or by means of suitable analysis methods in the regulation device.

In order to realize the active audio frequency block by means of the converter, it is preferably provided that the network-side audio frequency currents are impressed on the voltage progression generated by the converter. The measured audio frequency currents of the base frequency are thus superimposed or added up on the base frequency of the AC network, which is generated by the converter and supplied to the AC network.

Known converters or frequency converters are controlled by means of a pulse-width-modulated signal. This causes a DC voltage supplied to the generator side of the converter or frequency converter or AC converter to be relayed to the AC network for short periods of time with a switching frequency of a converter or frequency converter of a few kHz, for example 2.5 kHz to 10 kHz. The length of the periods of time, for which the voltage is relayed to the AC network, changes according to the AC voltage to be supplied. The pulses to be supplied to the network are wide in the maximum of the AC voltage progression. In the case of a zero point, the length of the pulses shortens to zero. For example, the maximum length of a pulse for a converter with a switching frequency of 2.5 kHz is approximately 0.4 ms. The harmonic oscillations of the switching frequency are clearly higher than the audio frequency range.

By means of pulse-width-modulated converters or frequency converters, signal forms can be modulated according to the Nyquist theorem, which contain frequency shares up to half of the switching frequency of the converter. The quality of the reproduction of the signal progression increases for low frequencies. In order to block audio frequency currents in the upper audio frequency range, a converter or frequency converter with a high switching frequency is preferably used.

If the network-side audio frequency currents are impressed on the voltage progression generated by the converter with the same or a changed phase, the network-side audio frequency currents will either be completely compensated, whereby the system appears to have a particularly high impedance at these audio frequencies, or inductive or capacitive reactive power is set for the corresponding audio frequency by means of a phase shift, which may be required due to consumers connected to the network. For ripple control frequencies, an equiphase impressing of the audio frequency current is optimal in order to preserve ripple control signals unweakened in the network.

In order to prevent audio frequency currents generated by the generator from getting into the AC network and, thereby, impairing the quality of the AC current, it is preferably provided that the generator-side audio frequency currents are impressed on the voltage progression generated by the converter or the frequency converter with the opposite phase.

A reaction hereby occurs to the fact that an audio frequency current generated by the generator, e.g. a harmonic oscillation of the base frequency, is impressed on the DC voltage, which is supplied to the frequency converter on the generator side, which leads to a fluctuation of the DC voltage amplitude with the corresponding frequency. Without compensation, this fluctuation would be forwarded via the converter or frequency converter to the AC network.

The suggested measure means that a wave trough of the curve progression generated by the converter is opposed to a wave peak of the voltage amplitude of the audio frequency current and vice versa so that the wave peak and the wave trough offset each other. The audio frequency current generated by the generator is not supplied to the AC network.

The method according to the invention experiences an advantageous embodiment if by means of the regulation device the phase shift of the base frequency generated by the converter can be or is set for the network-side AC current. In this manner, an inductive or capacitive reactance of the wind power plant or the power generator is flexibly adjusted for the requirements from consumers in the network.

In the regulation device, the generation of the signal controlling the converter preferably takes place such that through addition of the base frequency of the AC network and the frequencies of the network-side and/or generator-side audio frequency currents with their respective phases a voltage progression is formed in the regulation device regulating the converter. A curve progression is thus formed in the regulation device that is comprised of the base frequency of the AC network, if applicable with a phase shift, and the more frequent wave forms of the detected audio frequency currents with their respective phase shifts. This curve progression is transmitted in a suitable manner to the converter, which then forms a corresponding network-side voltage progression from the DC current supplied on the generator side and feeds it to the AC network.

The converter is advantageously regulated by means of a data processing system designed as a regulation device.

The regulation device preferably comprises a data processing system, in particular comprising at least one computer or processor. If the data processing system is made up of several computers or processors, each computer or processor is, for example, responsible for a preselected audio frequency. Digital signal processors (DSP) are also suitable as processors. Depending on the computing capacity, one or more frequencies are assigned to a computer or processor. The one computer or a central computer of the data processing system receives the results for the individual audio frequency currents and their phases and uses this to calculate an AC voltage or AC current progression to be generated by the frequency converter, which is to be supplied to the AC network.

The regulation device preferably works in-phase with the AC voltage in the AC network, in the so-called "positive sequence system," at a frequency of +50 Hz (+60 Hz). The regulation device preferably works or is also operated in the phase opposed to the AC voltage in the power network, in the so-called "negative sequence system" at a frequency of −50 Hz (or −60 Hz). The regulation device also advantageously comprises a control system, which works at an "audio frequency," for example at a ripple control frequency.

If the regulation device does not have sufficient computing capacity for all tasks, it is preferably provided that the operation of the regulation device in the phase opposed to the AC voltage in the AC network, i.e. in the negative sequence system, is deactivated during or through activation of the operation of the converter as an active audio frequency block. The operation of the regulation device in the negative sequence system is thus stopped and the released computing capacity or the released control system is assigned to operation in the audio frequency system.

Many generator systems have two AC converters, a generator-side AC converter (rectifier) and a network-side AC converter. In the case of full converter systems, the electrical power generated by the generator in the form of AC current is rectified by the generator-side AC converter and is converted by the network-side AC converter into an AC voltage corresponding to the network frequency.

In the case of double-fed asynchronous machines, as are used in many wind power plants, two AC converters are also present. In the case of the asynchronous generators used therein, its stator circuit is in direct connection with the AC network and is already operated in-phase and at the same frequency. The rotor circuit is connected with the AC network via a converter system with two AC converters. In both cases, one of the two AC converters is advantageously operated as an active frequency block.

If the network-side AC converter is operated as an active frequency block, it has the advantage that the calculated voltage curve is fed directly to the network without further converters. This is advantageously the case for full converter systems.

Moreover, there is the case that several converters exist in parallel, wherein each converter can or could generate a frequency. In this case, the generator system has several converters, wherein each converter is operated as an active frequency block.

In the case of double-fed asynchronous machines, the network-side AC converter is preferably operated as an active frequency block, since it has a linear transmission behavior compared to the machine-side converter. This results in advantages in the design, inasmuch as the generator can well transfer the audio frequencies with respect to its transmission behavior regarding harmonic oscillations. This transmission behavior is preferably taken into consideration during the calculation of the voltage progression in the regulation device. This type of generator system is advantageously used in a wind power plant.

The object is also solved by means of a method for the operation of a wind power plant, which has a converter or frequency converter or AC converter, wherein the converter or frequency converter or AC converter is operated as described above. We expressly refer to the above explanations in order to avoid repetitions.

The object underlying the invention is also solved by the use of a converter or frequency converter or AC converter, in particular of a wind power plant, of a power-generating generator as an active audio frequency block with respect to network-side and/or generator-side audio frequency currents, preferably in or on a wind power plant. This results in the same advantages as in the case of the method for the operation of a converter as an active audio frequency block.

Advantageously, the converter or frequency converter or AC converter used as an audio frequency block is operated according to a method described above.

The object underlying the invention is also solved through a computer program product with program code means, by means of which the process steps of the method described above can be executed, wherein a data processing system is designed as a regulation device. The operation of the converter or frequency converter or AC converter as an active audio frequency block is thus brought about in a simple manner through the use of a changed regulation software in the regulation device. Other constructive measures are not required. Existing current measuring points, and if applicable, existing band-pass filters can continue to be used. The computer program product provides program code means, with which in particular the AC current progression to be transmitted to the converter is determined and transmitted to the converter, and if applicable, audio frequency currents are detected at specifiable or specified frequencies.

The object is also solved through a data carrier with a computer program product saved on it, as described above.

Finally, the object underlying the invention is solved through a power-generating generator system with a regulation device for a converter or frequency converter or AC converter with the computer program product described above and a wind power plant with a corresponding power-generating generator system.

An active audio frequency block with good efficacy is created by means of the method according to the invention, the use, of the computer program product, of the generator system and the wind power plant, which does not require additional space and uses existing converters. There are, in general, no additional hardware costs, if the converter controller, i.e. the regulation device, has computing capacity reserves. Only corresponding software is required. If the controller is too limited, parts of the negative sequence system regulation can be used in that they are converted to an audio frequency regulation.

The audio frequency block blocks audio frequency currents from the outside. Ripple control signals are relayed in the network without weakening. Audio frequency currents generated by the generator are compensated. The frequency or frequencies for the audio frequency regulation is or are flexible and easily adjustable. A good effect of the active audio frequency block is achieved in particular at low audio frequencies.

The invention is described below, without restricting the general intent of the invention, based on exemplary embodiments in reference to the drawings, whereby reference is made to the drawings with regard to all details according to the invention that are not explained in greater detail in the text.

BRIEF DESCRIPTION OF THE DRAWINGS

FIG. 1 shows a schematic circuit diagram of an AC network with ripple control transmitter and wind power plant according to the state of the art, FIG. 2 shows a schematic circuit diagram of the topology of a known wind power plant, FIG. 3 shows a schematic circuit diagram of a known wind power plant with double-fed asynchronous generator, FIG. 4 shows an equivalent circuit diagram of a known wind power plant, FIG. 5 shows an equivalent circuit diagram of a wind power plant with an increased passive impedance according to the state of the art, FIG. 6 shows an equivalent circuit diagram of a wind power plant with a known external active audio frequency block and FIG. 7 shows an equivalent circuit diagram of a wind power plant with an internal active audio frequency block according to the invention.

DETAILED DESCRIPTION OF THE INVENTION

Figure 7:
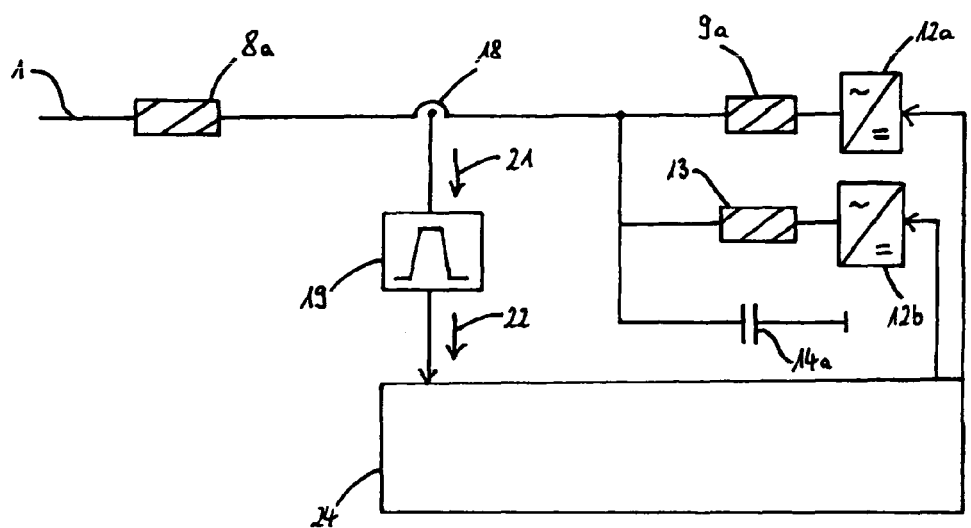

In the following figures, the same or similar types of elements or corresponding parts are provided with the same reference numbers in order to prevent the item from needing to be reintroduced.

FIG. 1 shows a schematic circuit diagram of an AC network 1 with a ripple control transmitter 2 and wind power plant 4 according to the state of the art. The AC network 1 has a connection to a ripple control transmitter 2, which has a connection impedance 3. The ripple control transmitter 2 feeds controls signals at the audio frequency to the AC network 1 or network 1. The control signals are determined for a consumer or receiver 6 connected downstream in the network.

A wind power plant 4 with a frequency-dependent impedance 5 is connected to the network 1 between the ripple control transmitter 2 and the receiver 6. Part of the signal current is diverted to the wind power plant 4 and is no longer available in network 1. The receiver 6 receives a weakened control signal, which no longer fulfils its purpose in some cases.

FIG. 2 shows a schematic circuit diagram of the topology of a wind power plant 4 according to the state of the art. A generator 9 with a status circuit 10 and a rotor circuit 11 is connected to the AC network 1 with its stator circuit 10 via a generator transformer 8. From rotor circuit 11, power is relayed to the generator transformer 8b via a frequency converter 12 and a network choke 13, wherein a filter 14 is connected parallel to the rotor circuit 11, in order to remove high frequency disturbances from the signal. The generator system 7 comprises the generator 9, the frequency converter 12, the power choke 13 and the filter 14.

As an exemplary embodiment, FIG. 3 shows the schematic circuit diagram of a known wind power plant 4 with a double-fed asynchronous generator. The wind power plant 4 extracts power from the wind by means of a rotor 15 and transmits it to the asynchronous generator 9 via a gear box 16. The stator circuit 10 is connected directly to the AC network 1. The rotor circuit 11 is connected with the network via a frequency converter 12, which comprises a generator-side frequency converter 12a and a network-side frequency converter 12b, and a generator transformer 8. The double-fed asynchronous generator has an adjustable nominal slippage range and an adjustable reactive power release.

The generator-side AC converter 12a or the network-side AC converter 12b is activated as an active audio frequency block. The generator-side AC converter 12a has larger reserves so that it is preferably activated. If a more direct control is desired, the network-side AC converter 12b is activated.

The equivalent circuit diagram of a wind power plant according to the state of the art is shown in FIG. 4. Starting from AC network 1, a series connection results from the transformer impedance 9a and a parallel switching of the impedances of the generator 9a, the choke 13a and the filter 14a. Together, these impedances result in the frequency-dependant overall impedance of the generator system 7 with respect to the AC network 1.

An equivalent circuit diagram of a wind power plant with increased passive impedance according to the state of the art is shown in FIG. 5, wherein an additional impedance 17 is switched in series with the generator transformer impedance 8a, which increases the overall impedance of the system. Examples are larger transformer impedances and passive audio frequency blocks.

A known active audio frequency block is shown in FIG. 6 based on an equivalent circuit diagram of a wind power plant. The current flowing in AC network 1 is supplied to the system including the audio frequency current via the impedance 8a of the generator transformer and is measured between the impedance 8a of the generator transformer and the parallel switching of the remaining impedances. The measured total current 21, which is made up of active current and audio frequency current, is filtered through a band-pass filter 19, which is tuned to the audio frequency. The measured audio frequency current 22 is fed to an amplifier 20, which gives an audio frequency compensation current 23 back to the network 1 via the generator transformer 8. The audio frequency currents, which flow into the system and are given back to the network from the amplifier, are offset so that at the network connection the overall impedance of the wind power plant 4 is high to almost unlimited.

FIG. 7 shows an equivalent circuit diagram of a wind power plant 4 with an internal active audio frequency block according to the invention. As in FIG. 6, the total current 18 between the generator transformer 8 and the branching into the parallel switching of the other impedances of the generator 9, the power choke 13 and the filter 14 are measured. The total current 18 is fed to the regulation device 24 via a band-pass filter 19. If the frequency analysis takes place in the regulation device 24, the band-pass filter 19 is omitted.

The regulation device 24 comprises one or more computers or processors, which on one hand are responsible for the generation of the signal to be generated by the converter(s) and on the other hand for the analysis of one or more network-side and/or generator-side audio frequency currents. In the regulation device 24, one or more network-side and/or generator-side audio frequency signals are captured in the regulation device 24 and are added with the base frequency of the network 1 to a total wave train, which are transmitted to the network-side AC converter 12b and/or the generator-side AC converter 12a, which generate(s) a corresponding wave form.

For audio frequency regulation, an audio frequency voltage is maintained on the AC converter 12a or 12b such that the total current contains no or only a very small audio frequency current. In the case of full converters, the generator side does not play a role and is not considered further. With respect to the network, the network-side AC converter 12b remains with the impedance 13. However, in the case of large outputs, two or more AC converters can work on the network and if applicable can also be controlled independently of each other.

The invention retains ripple control signals in the audio frequency range in the network with low costs and little constructive effort and if applicable network-side and/or generator-side harmonic oscillations of the base network frequency are suppressed or adjusted for consumer requirements of the network. Through the simple conversion of regulation systems, an internal active audio frequency block is also realized in the case of scarce computing capacity. The method according to the invention can be operated with all synchronous and asynchronous generator machines with frequency converters. In particular, a wind power plant or a frequency converter of a wind power plant is operated according to the method described above.

LIST OF REFERENCE NUMBERS

1 AC network
2 Ripple control transmitter
3 Connection impedance of the ripple control transmitter
4 Wind power plant
5 Impedance of the wind power plant
6 Additional end consumers or receivers
7 Generator system
8 Generator transformer
8a Impedance of the generator transformer
8b Generator transformer
9 Generator
9a Impedance of the generator
10 Stator circuit
11 Rotor circuit
12 Frequency converter
12a Generator-side AC converter
12b Network-side AC converter
13 Power choke
13a Power choke impedance
14 Filter (simplified)
14a Filter impedance
15 Rotor
16 Gear box
17 Additional impedance
18 Overall current measurement
19 Band-pass filter
20 Amplifier
21 Total measured current (active current+audio frequency current)
22 Received audio frequency current
23 Audio frequency compensation current
24 Regulation device

The invention claimed is:

1. A method for the operation of a converter of a power-generating generator system that can be connected to an electrical AC network, wherein the converter is operated by means of a regulation device regulating the converter as an active audio frequency block, comprising the steps of:
   detecting at least one audio frequency current of at least one specified audio frequency,
   determining an AC current progression to be transmitted to the converter in the regulation device, wherein at least one detected audio frequency current is at least partially impressed on the AC current progression,
   generating the AC current progression in the converter, and supplying the AC current progression generated by the converter to the AC network.

2. The method according to claim 1, wherein network-side audio frequency currents are detected.

3. The method according to claim 1, wherein the audio frequency currents are at least one of:
   captured at a network supply point, and
   regulated at a network supply point.

4. The method according to claim 1, wherein a ripple control signal is supplied by means of the converter.

5. The method according to claim 2, wherein the network-side audio frequency currents are filtered out of the network-side AC current by means of at least one band-pass filter and are relayed to the regulation device.

6. The method according to claim 2, wherein the network-side audio frequency currents are detected in the regulation device.

7. The method according to claim 1, wherein generator-side audio frequency currents are detected.

8. The method according to claim 7, wherein the generator-side audio frequency currents are filtered out of the generator-side AC current by means of at least one band-pass filter and are at least one of:
- relayed to the regulation device, and
- detected in the regulation device.

9. The method according to claim 1, wherein the active audio frequency block is adapted to be set for a predetermined, limited frequency range for one of mono-frequent and narrow-band, network-side signals.

10. The method according to claim 9, wherein the predetermined, limited frequency range is adapted to be set to a ripple control frequency, wherein harmonic frequencies of a base frequency adjacent in a frequency spectrum are weakened compared to the ripple control frequency.

11. The method according to claim 9, wherein the predetermined, limited frequency range is adapted to be set to at least one harmonic frequency of a base frequency.

12. The method according to claim 2, wherein the network-side audio frequency currents are impressed on a voltage progression generated by the converter.

13. The method according to claim 12, wherein the network-side audio frequency currents are impressed on the voltage progression generated by the converter with one of the same and a changed phase.

14. The method according to claim 7, wherein the generator-side audio frequency currents are impressed on the voltage progression generated by the converter with an opposite phase.

15. The method according to claim 2, wherein a phase shift of a base frequency generated by the converter is adapted to be set for the network-side AC current by means of the regulation device.

16. The method according to claim 2, wherein through addition of a base frequency of the AC network and the frequencies of at least one of the network-side and generator-side audio frequency currents with their respective phases a voltage progression is formed in the regulation device regulating the converter.

17. The method according to claim 1, wherein the converter is regulated by means of a data processing system designed as a regulation device.

18. The method according to claim 1, wherein the regulation device is operated in-phase with the AC voltage in the AC network.

19. The method according to claim 18, wherein the regulation device is operated in a phase opposite the AC voltage in the AC network.

20. The method according to claim 19, wherein the operation of the regulation device in the phase opposite the AC voltage in the AC network is deactivated through activation of the operation of the converter as an active frequency block.

21. The method according to claim 1, wherein the generator system has a generator-side AC converter and a network-side AC converter, of which at least one AC converter is operated as an active frequency block.

22. The method according to claim 21, wherein the network-side AC converter is operated as an active frequency block.

23. The method according to claim 21, wherein the generator-side AC converter is operated as an active frequency block.

24. The method according to claim 1, wherein the generator system has several converters, wherein each converter is operated as an active frequency block.

25. A method for the operation of a wind power plant with a converter, wherein the converter is operated by means of a regulation device regulating the converter as an active audio frequency block, comprising the steps of:
- detecting at least one audio frequency current of at least one specified audio frequency,
- determining an AC current progression to be transmitted to the converter in the regulation device, wherein at least one detected audio frequency current is at least partially impressed on the AC current progression,
- generating the AC current progression in the converter, and
- supplying the AC current progression generated by the converter to the AC network.

26. A method of use of a converter of a power-generating generator system of a wind power plant as an active audio frequency block with respect to at least one of network-side audio frequency currents and generator-side audio frequency currents, wherein the converter is operated by means of a regulation device regulating the converter as an active audio frequency block, comprising the steps of:
- detecting at least one audio frequency current of at least one specified audio frequency,
- determining an AC current progression to be transmitted to the converter in the regulation device, wherein at least one detected audio frequency current is at least partially impressed on the AC current progression,
- generating the AC current progression in the converter, and
- supplying the AC current progression generated by the converter to the AC network.

27. A computer program with program code means, by means of which process steps of a method are executed, wherein the method is for the operation of a converter of a power-generating generator system that can be connected to an electrical AC network, wherein the converter is operated by means of a regulation device regulating the converter as an active audio frequency block, comprising the steps of:
- detecting at least one audio frequency current of at least one specified audio frequency,
- determining an AC current progression to be transmitted to the converter in the regulation device, wherein at least one detected audio frequency current is at least partially impressed on the AC current progression,
- generating the AC current progression in the converter, and
- supplying the AC current progression generated by the converter to the AC network,
- wherein a data processing system is designed as a regulation device.

28. The computer program according to claim 27, wherein the computer program is saved on a data carrier.

29. A power-generating generator system with a regulation device for a converter, wherein the regulation device is a computer program with program code means, by means of which process steps of a method are executed, wherein the method is for the operation of a converter of a power-generating generator system that can be connected to an electrical AC network, wherein the converter is operated by means of a regulation device regulating the converter as an active audio frequency block, comprising the steps of:
- detecting at least one audio frequency current of at least one specified audio frequency,
- determining an AC current progression to be transmitted to the converter in the regulation device, wherein at least one detected audio frequency current is at least partially impressed on the AC current progression,
- generating the AC current progression in the converter, and
- supplying the AC current progression generated by the converter to the AC network.

30. The power-generating generator system according to claim 29, wherein the power-generating generator system is used in a wind power plant.

* * * * *